(12) United States Patent
Bian et al.

(10) Patent No.: US 12,522,694 B1
(45) Date of Patent: Jan. 13, 2026

(54) HIGH-VISCOSITY PETG OR PCTG POLYMERIZATION REACTOR AND METHOD FOR POLYMERIZING PETG OR PCTG

(71) Applicants: JIANGSU GUOWANG HIGH-TECHNIQUE FIBER CO., LTD., Suzhou (CN); GUOWANG HIGH-TECH FIBER (SUQIAN) CO., LTD., Suqian (CN)

(72) Inventors: Shuchang Bian, Suzhou (CN); Junsong Tang, Suzhou (CN)

(73) Assignees: JIANGSU GUOWANG HIGH-TECHNIQUE FIBER CO., LTD., Suzhou (CN); GUOWANG HIGH-TECH FIBER (SUQIAN) CO., LTD., Suqian (CN)

( * ) Notice: Subject to any disclaimer, the term of this patent is extended or adjusted under 35 U.S.C. 154(b) by 0 days.

(21) Appl. No.: 19/022,597

(22) Filed: Jan. 15, 2025

Related U.S. Application Data

(63) Continuation of application No. PCT/CN2024/093555, filed on May 16, 2024.

(30) Foreign Application Priority Data

Feb. 6, 2024 (CN) .......................... 202410166671.9

(51) Int. Cl.
| | | |
|---|---|---|
| C08G 63/02 | (2006.01) | |
| B01J 19/00 | (2006.01) | |
| B01J 19/06 | (2006.01) | |
| B01J 19/18 | (2006.01) | |
| C08G 63/199 | (2006.01) | |
| C08G 63/78 | (2006.01) | |
| C08G 63/86 | (2006.01) | |

(52) U.S. Cl.
CPC ........ *C08G 63/785* (2013.01); *B01J 19/0066* (2013.01); *B01J 19/06* (2013.01); *B01J 19/18* (2013.01); *C08G 63/199* (2013.01); *C08G 63/863* (2013.01)

(58) Field of Classification Search
USPC ........ 528/190, 193, 194, 196, 272, 274, 279
See application file for complete search history.

(56) References Cited

U.S. PATENT DOCUMENTS

| | | | |
|---|---|---|---|
| 6,423,275 B1 | 7/2002 | D'Souza | |
| 2025/0198056 A1* | 6/2025 | Bian | ................. D01F 8/14 |

FOREIGN PATENT DOCUMENTS

| | | |
|---|---|---|
| CH | 673595 A5 | 3/1990 |
| CN | 1769319 A | 5/2006 |
| CN | 203316118 U | 12/2013 |
| CN | 207604175 U | 7/2018 |
| CN | 110280202 A | 9/2019 |
| CN | 111545152 A | 8/2020 |
| CN | 111560116 A | 8/2020 |
| CN | 211936892 U | 11/2020 |
| CN | 212819830 U | 3/2021 |
| CN | 212819836 U | 3/2021 |
| CN | 215462133 U | 1/2022 |
| CN | 115888612 A | 4/2023 |
| CN | 118765213 A | 10/2024 |
| JP | 2002121091 A | 4/2002 |

OTHER PUBLICATIONS

Guocai, Zha, Discussion of the characteristics and structural details of the disc type continuous dryer, Changzhou One Step Drying Equipment Co., Ltd., Changzhou 213116, Jiangsu, 12 pages.

* cited by examiner

*Primary Examiner* — Terressa Boykin
(74) *Attorney, Agent, or Firm* — Dinsmore & Shohl LLP

(57) ABSTRACT

The present disclosure relates to a high-viscosity PETG or PCTG polymerization reactor and a method for polymerizing PETG or PCTG. The polymerization reactor is provided with two shafts in front and rear, the two shafts are respectively provided with a plurality of disc reactors, and the polymerization reactor is divided into a low viscosity zone, a med-high viscosity zone, and a high viscosity zone; the disc reactors in the high viscosity zone are single discs that can be quickly disassembled; a plurality of scrapers is further arranged on a wall of the polymerization reactor between each two adjacent single discs in the high viscosity zone, the distance between each scraper and the adjacent single disc is different, which can gradually reduce the thickness of the high-viscosity melt on the discs, improve the devolatilization efficiency. The polymerization reactor can prepare PETG or PCTG with high viscosity and excellent hue performance.

20 Claims, 5 Drawing Sheets

HIGH-VISCOSITY PETG OR PCTG POLYMERIZATION REACTOR AND METHOD FOR POLYMERIZING PETG OR PCTG

CROSS-REFERENCE TO RELATED APPLICATIONS

This application is a Continuation Application of PCT App. Serial No. PCT/CN2024/093555, having an International Filing Date of May 16, 2024, which claims the benefit of priority to Chinese Patent Application No. 202410166671.9 filed on Feb. 6, 2024, and the entire disclosure of both are hereby incorporated by reference.

TECHNICAL FIELD

The present disclosure relates to a high-viscosity PETG or PCTG polymerization reactor and a method for polymerizing PETG or PCTG.

BACKGROUND

PETG and PCTG are both transparent, amorphous copolyesters. Both the two can be prepared by esterification and polymerization reactions using terephthalic acid PTA, ethylene glycol EG, and 1, 4-cyclohexanedimethanol CHDM in the presence of esterification and polymerization catalysts. The two can be distinguished according to the different mole proportions of segments corresponding to CHDM in the total diol (CHDM and EG) segments in the copolyesters. Generally, the polymerization products having segments corresponding to CHDM in a molar ratio of 31% to 32% are called PETG copolyesters; while the polymerization products having segments corresponding to CHDM in a molar ratio of 60% to 62% are called PCTG copolyesters. Both the two polymerization products have high transparency, good toughness and impact strength, excellent low-temperature toughness, high tear resistance, good processing performance, and excellent chemical resistance. Both can be processed using traditional molding methods such as extrusion, injection molding, blow molding, and vacuum forming. Both can be widely used in the markets of plates and sheets, high-performance shrink films, bottles, and profiles; they can also be used to produce toys, household utensils, and medical supplies, etc.

When synthesizing PETG or PCTG using existing technologies, an ordinary horizontal polymerization reactor is usually used, with an ordinary disk reactor inside, however, during the polymerization of the two, due to the high dynamic viscosity of the melt, there will be a rod-climbing effect of the melt on the disc reactor, resulting in the accumulation of the melt on the disc of the disk reactor, excessive thickness of the melt on the wall of the polymerization reactor and the disc reactor, and slowing down the mass transfer rate of the material, which is not conducive to further polymerization. In addition, the adhered melt will cause an increase in the load on the agitating motor of the disc reactor, further reducing the efficiency of the polymerization reaction, meanwhile there are also significant obstacles to cleaning the melt on the polymerization reactor and the disc reactor, significantly shortening the operating cycle of the polymerization device.

For PETG or PCTG melts, in the polymer macromolecular chain elements, PETG contains 31%~32% CHDM structural units, while PCTG contains 60%~62% CHDM structural units, and the rigid segments are combined with cis-trans structures, resulting in a significant increase in steric hindrance, therefore, the vibration and reptation are severely limited when the region segments and chain elements of the polymer macromolecular chain are heated, therefore, as the polymer molecular weight increases, the motion difficulty of the macromolecular chain rapidly increases, and macroscopically, it manifests as a rapid increase in the viscous properties of the melts, making it highly susceptible to wrapping around the discs in a high-viscosity state, moreover, due to the poor elasticity of the melts, shear thinning is prone to occur at high temperatures (278~285° C.), and the tensioned film is very easy to break, making the polymerization reaction difficult to control. In addition, due to the slowed mass transfer rate of polymer materials, the viscosity of the final melt may not be high enough, and the hue of the polymerization products PETG or PCTG may not be excellent enough.

SUMMARY

A purpose of the present disclosure is to provide a high-viscosity PETG or PCTG polymerization reactor for preparing a high-viscosity PETG or PCTG melt, where the high-viscosity PETG or PCTG melt prepared using this polymerization reactor has high viscosity, and can significantly improve the hue performance of the polymerization product while ensuring excellent other performances, the polymerization reactor can also extend the operating cycle of the polymerization device and is easy to clean.

Another purpose of the present disclosure is to provide a method for polymerizing PETG or PCTG, which can prepare PETG or PCTG polymerization products with high viscosity and significantly improved hue performance.

To achieve the above purpose, a technical solution employed by the present disclosure is: a polymerization reactor for preparing a PETG or PCTG melt having an intrinsic viscosity above 0.770, where the polymerization reactor is a horizontal polymerization reactor, and comprises a main body containing a chamber internally, the main body comprises a low viscosity zone, a med-high viscosity zone and a high viscosity zone arranged in sequence along the axial direction of the polymerization reactor, the viscosity of the PETG or PCTG melt in the low viscosity zone, the med-high viscosity zone and the high viscosity zone increases in sequence; the polymerization reactor further comprises two agitating shafts, one agitating shaft is arranged in the low viscosity zone, and the other agitating shaft is arranged in the med-high viscosity zone and the high viscosity zone; the two agitating shafts are respectively provided with a plurality of disc reactors, the disc reactors in the low viscosity zone are six to eight disc combinations, with three to ten discs in each combination; the disc reactors in the med-high viscosity zone are five to eight disc combinations in form of two-disc or three-disc combination; the disc reactors in the high viscosity zone are single discs, and the single discs are arranged in the polymerization reactor in a detachable manner; a combination of scrapers is further arranged on a wall of the polymerization reactor between each two adjacent single discs in the high viscosity zone, the combination of scrapers comprises a plurality of scrapers, and the distance between each scraper and an adjacent single disc is different.

In the present disclosure, PETG refers to a copolyester of terephthalic acid PTA, ethylene glycol EG, and 1, 4-cyclohexanedimethanol CHDM in which the segments corresponding to CHDM account for 31% to 32% by mole of the total diol (CHDM and EG) segments; PCTG refers to a copolyester of terephthalic acid PTA, ethylene glycol EG, and 1, 4-cyclohexanedimethanol CHDM in which the segments corresponding to CHDM account for 60% to 62% by mole of the total diol (CHDM and EG) segments.

In the present disclosure, the distance between each scraper and an adjacent single disc refers to the distance from the contact position between the scraper and the wall of the polymerization reactor to the adjacent disc reactor.

In the present disclosure, the disc combination refers to the fixed connection of two or more adjacent disc reactors together to form a disc combination.

In some implementations, the disc reactors in the high viscosity zone comprise circular rings and a plurality of spokes arranged inside the circular rings, the circular rings comprise first portions and second portions, the first portions are fixedly connected to the plurality of spokes, respectively, and the second portions are detachably connected to the first portions.

In some implementations, the detachable connection is a threaded connection.

The form of threaded connection may be that screw holes are provided at the ends of both the first portions and the second portions, the two can be matched, then, impact bolts are docked with them to make the entire circular rings form smooth integral discs, which can keep the device running without forming dead space.

In some implementations, the plurality of spokes is five spokes.

In some implementations, positioning screw holes extending left and right are designed on the top ends of the spokes of the disc reactors in the high viscosity zone, the circular rings corresponding to adjacent spokes are designed with detachable segmented circular rings and matched with the screw holes at the ends of the spokes, to dock with the impact bolts and form smooth integral circular rings.

In some implementations, the plurality of scrapers is arranged vertically, with the end directions of the scrapers pointing towards the axes of the agitating shafts, and the projections of the plurality of scrapers on the plane where the disc reactors are located are on the same circle.

In some implementations, the length of each scraper is the same.

In some implementations, in the high viscosity zone, the distance between a scraper and the adjacent previous single disc is distributed in an arithmetic sequence in every two adjacent single discs. Based on that the projections of the plurality of scrapers on the plane where the disc reactors are located are on the same circle, the scrapers are actually mounted in a spiral state between two adjacent single discs.

In some implementations, in each combination of scrapers, the distance between the first scraper and the adjacent previous single disc is 30~100 mm, and the distance between the last scraper and the adjacent next single disc is 30~100 mm, preferably 40~80 mm, and more preferably 50~70 mm.

In some implementations, in each combination of scrapers, the axial distance between every two adjacent scrapers is 15~25 mm, preferably 20~25 mm. In the present disclosure, the axial distance between every two adjacent scrapers refers to the distance between the projections of the two adjacent scrapers on the agitating shaft.

In some implementations, the cross-section of the scrapers is in a wedge shape, and the thick end of the wedge is oriented towards the direction of rotation of the disc reactors.

In some implementations, there are five scrapers arranged between every two adjacent single discs. The number of scrapers is provided to be the same as the number of spokes, making it easy to disassemble or clean quickly.

In some embodiments, the total number of disc reactors in the low viscosity zone is 30~45, the total number of disc reactors in the med-high viscosity zone and the high viscosity zone is 13~20, the total number of disc reactors in the high viscosity zone is 8~12, and 8~12 combinations of scrapers are provided in the high viscosity zone.

In some implementations, the length of the low viscosity zone is half of the length of the polymerization reactor, and the total length of the med-high viscosity zone and the high viscosity zone is half of the length of the polymerization reactor; and the ratio of the length of the med-high viscosity zone to that of the high viscosity zone is 1:2.

In the present disclosure, half is not an exact mathematical value of half, but refers to a value roughly or around half, approximately equal to half.

In some implementations, the polymerization reactor further comprises a supporting seat fixedly arranged on an inner wall of the main body for supporting the two agitating shafts.

In some implementations, the polymerization reactor further comprises a prepolymer inlet located at the bottom of the front end of the low viscosity zone and a high-viscosity melt outlet located at the bottom of the rear end of the high viscosity zone, wherein the high-viscosity melt outlet is trumpet-shaped.

In some implementations, the diameter of the single discs in the high viscosity zone decreases from front to rear, and the diameter of the last single disc in the high viscosity zone is 90%~92% of the diameter of the first single disc in the high viscosity zone.

In some implementations, the distance between the disc reactors and the top of the polymerization reactor is 200~300 mm.

In some implementations, the distance between the disc reactors and the bottom of the polymerization reactor is 20~50 mm.

The polymerization reactor of the present disclosure is provided with the combination of single discs in the high viscosity zone, forming a controllable film-forming structure in the high viscosity zone, the combinations of progressive type scrapers in the high viscosity zone is mounted on the wall of the polymerization reactor, it is preferred that each combination of scrapers comprises five scrapers (five sub blades), and more preferably the five sub blades are evenly distributed and mounted in a spiral between two adjacent single discs, the distance between the first blade to the fifth blade from front to back (in the material propelling direction) along the inner circle of the wall of the polymerization reactor in each combination of scrapers and its previous single disc gradually decreases, thereby gradually reducing the thickness of the thickened high-viscosity melt film on the rotating upward disc, which ensures that the material on the discs is updated five times during each rotation cycle, and which can achieve the effect of mixing twice at the sub blades of two lower scrapers. Compared with existing integrated scrapers, the uniformly distributed split type combined scrapers have a more reasonable control over the film thickness of high-viscosity melt, significantly reducing the scraper load, meanwhile, intermittent stress can cause gravity settling of the high-viscosity material in the middle of the discs, maintaining a good devolatilization channel in the middle space of the disc reactors and avoiding the situation where the melt submerges the scrapers and blocks the middle devolatilization channel under high viscosity conditions of the current integrated scrapers. Therefore, adopting the specific combination of progressive scraper configuration of the present disclosure can effectively improve the devolatilization efficiency of the high viscosity zone.

The present disclosure also provides a polymerization method for preparing PETG or PCTG using the aforementioned polymerization reactor for preparing PETG or PCTG melt, where the PETG or PCTG has an intrinsic viscosity above 0.770, and the polymerization method comprises a step of sequentially passing terephthalic acid, ethylene glycol, and 1, 4-cyclohexanedimethanol through a first esterification reactor and a second esterification reactor for esterification reactions, through a first prepolymerization reactor and a second prepolymerization reactor for prepolymerization reactions to give a prepolymer, and a step of adding the prepolymer to the polymerization reactor to carry out a polymerization reaction to obtain the PETG or PCTG.

In some implementations, the PETG has an intrinsic viscosity of 0.770~0.820, and the PCTG has an intrinsic viscosity of 0.790~0.820.

In some implementations, the preparation method further comprises a step of adding an esterification catalyst to the first esterification reactor before carrying out the esterification reaction, wherein the esterification catalyst is selected from tetrabutyl titanate, tetraisopropyl titanate, and tetra (2-ethylhexyloxy) titanate.

In some implementations, the mass of titanium element in the esterification catalyst accounts for 1~3 ppm of the mass of the PETG or PCTG.

In some implementations, the esterification reaction in the first esterification reactor is carried out at a pressure of 70~80 kPa.

In some implementations, the esterification reaction in the first esterification reactor is carried out at 255~257° C.

In some implementations, the prepolymerization reaction in the first prepolymerization reactor is carried out at a vacuum degree of 9~12 kPa.

In some implementations, the prepolymerization reaction in the second prepolymerization reactor is carried out at a vacuum degree of 9~12 kPa.

In some implementations, the prepolymerization reaction in the first prepolymerization reactor is carried out at 258~266° C.

In some implementations, the prepolymerization reaction in the second prepolymerization reactor is carried out at a vacuum degree of 0.9~1.3 kPa.

In some implementations, the prepolymerization reaction in the second prepolymerization reactor is carried out at 260~267° C.

In some implementations, the polymerization reaction in the polymerization reactor is carried out at a vacuum degree of 100~130 Pa.

In some implementations, the polymerization reaction in the polymerization reactor is carried out at 265~275° C.

In some implementations, the esterification reaction in the second esterification reactor is carried out at atmospheric pressure.

In some implementations, the second esterification reactor is a horizontal reactor, and comprises three compartments arranged in sequence from front to rear, and the preparation method further comprises a step of injecting a polymerization catalyst to the third compartment from front to rear of the second esterification reactor.

In some implementations, the polymerization catalyst is selected from a germanium dioxide aqueous solution, a suspension of germanium dioxide dispersed in a mixed solvent of water and ethylene glycol, a surface deposited supported germanium-based catalyst, and a surface deposited supported titanium-germanium-based composite catalyst.

In some implementations, the surface deposited supported germanium-based catalyst and the surface deposited supported titanium-germanium-based composite catalyst comprise a carrier, a supported deposition layer, and an active component, where the carrier is an inorganic porous material modified and coated by silicate ester, the supported deposition layer is located on the carrier and has a porous structure, and the active component is deposited on the supported deposition layer.

In some implementations, the surface deposited supported germanium-based catalyst is prepared by a preparation method comprising steps of: precipitating, filtering, and calcining a suspension of a carrier, a water-soluble calcium salt, a water-soluble aluminum salt, a water-soluble zirconium salt with a water-soluble hydroxide and an alkali to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source to obtain a catalyst precursor; carrying out a coating reaction on the catalyst precursor with silicate ester and water, and depositing the active component on the supported deposition layer to obtain the surface deposited supported germanium-based catalyst.

In some implementations, the surface deposited supported titanium-germanium-based catalyst is prepared by a preparation method comprising steps of: precipitating, filtering, and calcining a suspension of a carrier, a water-soluble calcium salt, a water-soluble aluminum salt, a water-soluble zirconium salt with a water-soluble hydroxide and an alkali to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a solution of a germanium source in hydrochloric acid and a titanium source to obtain a catalyst precursor; carrying out a coating reaction on the catalyst precursor with silicate ester and water, and depositing the active component on the supported deposition layer to obtain the surface deposited supported titanium-germanium-based composite catalyst.

In some implementations, the inorganic porous material is selected from nanoporous alumina, nanoporous alumina-zirconia, nanoporous silica, nanoporous barium sulfate, and combinations thereof, with a particle size of 20~80 nm, preferably 25~60 nm, more preferably 30~45 nm, and a specific surface area of 220~400 $m^2/g$, preferably 230~320 $m^2/g$.

In some implementations, the water-soluble calcium salt, the water-soluble aluminum salt and the water-soluble zirconium salt for preparing the carrier containing the supported deposition layer are selected from sulfates, acetates, or chlorides of corresponding metal elements, respectively; and/or, the water-soluble hydroxide is selected from one or two of sodium hydroxide and potassium hydroxide.

In some implementations, the carbonates are selected from sodium carbonate, potassium carbonate, ammonium carbonate, and combinations thereof.

In some implementations, the bicarbonates are selected from sodium bicarbonate, potassium bicarbonate, ammonium bicarbonate, and combinations thereof.

In some implementations, the molar ratio of the water-soluble calcium salt, the water-soluble aluminum salt and the water-soluble zirconium salt for preparing the carrier containing the supported deposition layer is (0.5~2.5): (1.0~2.0): (0.8~3.5).

In some implementations, the molar ratio of the water-soluble calcium salt, the water-soluble aluminum salt and the water-soluble zirconium salt are added dropwise to the suspension of the carrier in the form of an aqueous solution; the water-soluble hydroxide and the alkali are added dropwise to the suspension of the carrier in the form of an aqueous solution; and the preparation method controls the synchronous dropwise addition of both.

In some implementations, the molar concentration of the water-soluble calcium salt in the aqueous solution is 0.1~3.0 mol/L.

In some implementations, the molar concentration of the water-soluble aluminum salt in the aqueous solution is 0.5~2.5 mol/L.

In some implementations, the molar concentration of the water-soluble zirconium salt in the aqueous solution is 0.1~3.5 mol/L.

In some implementations, the total molar concentration of the water-soluble hydroxide and the alkali in their aqueous solution is 0.1~2.0 mol/L.

In some implementations, when forming the supported deposition layer on the carrier, the precipitation reaction is carried out under a pH of 10~12.

In some implementations, the time of the precipitation reaction is 8~11 hours.

In some implementations, the temperature for the precipitation reaction is 70~100° C.

In some implementations, the preparation method further comprises steps of agitating the suspension for 1.0~4 h after the precipitation reaction is completed, then increasing the pressure to 0.7~1.2 MPa, agitating and heating to 180~200° C., equilibrating for 2~4 hours, and then rapidly releasing the pressure to atmospheric pressure, lowering the suspension to room temperature, filtering, washing, drying, and crushing.

In some implementations, the preparation method further comprises a step of forming pores on the carrier after the precipitation reaction and before filtration; preferably, the step of forming pores on the carrier comprises steps of pressurizing and heating the reaction system after the precipitation reaction, and reducing the pressure to atmospheric pressure.

In some implementations, the pressurized pressure ranges from 0.7~1.2 MPa.

In some implementations, the temperature is raised to 180~200° C., to decompose the carbonate hydroxide generated by the precipitation reaction, thereby increasing the specific surface area of the carrier.

In some implementations, when forming the supported deposition layer on the carrier, the temperature for the heating treatment is 290~310° C.

In some implementations, the time for the heating treatment is 2~6 hours.

In some implementations, the supported deposition layer is further dehydrated and pore-formed, and the specific surface area of the carrier powder containing the supported deposition layer after treatment is 600~900 m$^2$/g, with a particle size of 20~50 nm and a large number of nano micropores formed on the surface of the powder.

In some implementations, the germanium source is selected from one or two of germanium tetrachloride and tetraethylgermanium.

In some implementations, the silicate ester is selected from tetraethyl silicate, tetrabutyl silicate, tetrapropyl silicate, and combinations thereof.

In some implementations, the germanium source is added dropwise to the suspension of the carrier containing the supported deposition layer for hydrolysis reaction.

In some implementations, the mass ratio of the silicate ester to the germanium source is 1: (0.2~0.5).

In some implementations, in the surface deposited supported germanium-based catalyst, the mass ratio of the carrier, the supported deposition layer and the effective germanium in the active component is (72.5~87.5): (7.5~12.5): (5.0~15.0). In the present disclosure, the effective germanium in the active component refers to the germanium element in the active component calculated as germanium dioxide in equimolar terms.

In some implementations, the preparation method further comprises preparing a surface deposited supported germanium-based catalyst into a suspension with a mass concentration of 10%-20% in ethylene glycol under agitating conditions, after agitating evenly, grinding and filtering to prepare a catalyst suspension, where the effective germanium element content (in terms of germanium dioxide) in the catalyst suspension is 1.0%~3.0%, which is a stable suspension and can be stored for 3.0~5.0 months without sedimentation.

For germanium-based catalysts, in some implementations, the preparation method further comprises steps of filtering, washing, and drying after the active component is loaded on the supported deposition layer, wherein the supported catalyst is in a powder state; preferably, the effective germanium content in the supported catalyst in powder state is 5.0%~15.0%.

For the titanium-germanium-based catalyst, in some implementations, the preparation method further comprises steps of filtering, washing, and drying after the active component is loaded on the supported deposition layer, wherein the supported catalyst is in a powder state; preferably, in the supported catalyst in powder state, the effective germanium content is 2.5%~7.5%, and the effective titanium content is 0.6%~1.9%.

In some implementations, the germanium source is selected from one or two of germanium tetrachloride and tetraethylgermanium.

In some implementations, the silicate ester is selected from tetraisopropyl titanate, tetrabutyl titanate, titanium tetrachloride, and combinations thereof.

In some implementations, the silicate ester is selected from tetraethyl silicate, tetrabutyl silicate, tetrapropyl silicate, and combinations thereof.

In some implementations, the solution of a germanium source in hydrochloric acid and the titanium source is added dropwise to the suspension of the carrier containing the supported deposition layer for hydrolysis reaction.

In some implementations, the ratio of the mass of the silicate ester to the total mass of the germanium source and the titanium source is 1: (0.2~0.5).

For the titanium-germanium-based catalyst, in some implementations, in the surface deposited supported titanium-germanium-based catalyst, the mass ratio of the carrier, the supported deposition layer and the effective germanium and the effective titanium in the active component is (78.1~89.4): (7.5~12.5): (2.5~7.5) (in terms of germanium dioxide): (0.6~1.9) (in terms of titanium dioxide). In the present disclosure, the effective titanium refers to the titanium element in the active component calculated as titanium dioxide in equimolar terms.

In some implementations, the molar ratio of the titanium element to the germanium element in the active component is 1: (1.5~4.5).

For germanium-based catalysts, in some implementations, the preparation method further comprises steps of filtering, washing, adding a mixed solvent of water and ethylene glycol to disperse after the active component is loaded on the supported deposition layer, wherein the supported catalyst is in a suspension state.

For titanium-germanium-based catalysts, in some implementations, the preparation method further comprises steps of filtering, washing, adding a mixed solvent of water and ethylene glycol to disperse after the active component is loaded on the supported deposition layer, wherein the supported catalyst is in a suspension state.

In some implementations, the supported germanium-based catalyst and the titanium-germanium-based composite catalyst both have a particle size of 60~150 nm, and a specific surface area of 100~280 $m^2/g$, the particle size of the catalysts is between nanometer and sub-nanometer, and the catalytic active center is in nanometer state on the surface of the catalyst particles and can fully contact with oligomers, which improves the catalytic efficiency of polymerization reaction.

When preparing the aforementioned surface deposited supported germanium-based or titanium-germanium-based nano-catalyst, the supported deposition layer is first prepared on the carrier through a co-precipitation reaction of salts of calcium, aluminum, zirconium, etc., and the supported deposition layer is basic carbonates of three metals and provides a loading deposition site for the active component. The basic carbonates are decomposed into carbon dioxide gas after calcination, so that the supported deposition layer has a porous structure, and the specific surface area of this layer is larger than the specific surface area of the carrier, that is, the present disclosure increases the specific surface area of the carrier by precipitating the supported deposition layer on the carrier, and at the same time makes the carrier have more microporous structure, which is more conducive to the effective loading of the active component. Wherein, the zirconium element in the supported deposition layer can increase the strength of the carrier, and the calcium and aluminum elements are beneficial to the formation of the porous structure of the supported deposition layer. When used to catalyze the synthesis of PETG or PCTG polyesters, the in-situ deposited germanium element or the composite element of germanium and titanium has a larger specific surface area, which can obtain better catalytic activity and reaction efficiency.

In some implementations, the polymerization catalyst is selected from a germanium dioxide aqueous solution, and a suspension of germanium dioxide dispersed in a mixed solvent of water and ethylene glycol, and the mass of germanium dioxide in the polymerization catalyst accounts for 100~150 ppm of the mass of PETG or PCTG.

In some implementations, the polymerization catalyst is selected from surface deposited supported germanium-based catalysts, and the mass of the germanium element (in terms of germanium dioxide) in the polymerization catalyst accounts for 40~90 ppm, preferably 50~75 ppm of the mass of PETG or PCTG.

In some implementations, the polymerization catalyst is selected from surface deposited supported titanium-germanium-based composite catalysts, and the mass of the titanium element and the germanium element (in terms of germanium dioxide) in the polymerization catalyst accounts for 8~12 ppm and 25~50 ppm of the mass of PETG or PCTG, respectively.

In some implementations, the polymerization method further comprises steps of premelting 1,4-cyclohexanedimethanol and transporting the melted 1,4-cyclohexanedimethanol to the first esterification reactor.

In some implementations, the polymerization reactor further comprises a steam feed inlet for introducing superheated ethylene glycol steam at the top of the main body at the rear end portion of the low viscosity zone, the rear end portion of the med-high viscosity zone, and the rear end portion of the high viscosity zone, and the polymerization method further comprises steps of using a metering system to meter the superheated ethylene glycol steam and introducing it into the polymerization reactor.

In some implementations, when preparing PETG, the feeding molar ratio of terephthalic acid, ethylene glycol, and 1,4-cyclohexanedimethanol is 1: (0.92~0.93): (0.325~0.315); or, when preparing PCTG, the feeding molar ratio of terephthalic acid, ethylene glycol, and 1,4-cyclohexanedimethanol is 1: (0.63~0.64): (0.610~0.615).

The present disclosure further provides PETG or PCTG prepared by the above-mentioned method for polymerizing PETG or PCTG.

In some implementations, the PETG has an intrinsic viscosity of 0.780~0.820 (measured in phenol: tetrachloroethane in a volume ratio of 3:2).

In some implementations, the PETG has a hue L value≤62.0, and b value≥1.0, with a high chroma.

In some implementations, the PCTG has an intrinsic viscosity of 0.800~0.820 (in phenol:

tetrachloroethane in a volume ratio of 3:2).

In some implementations, the PCTG has a hue L value≤62.0, and b value≥1.0, with a high chroma.

Due to the use of the above technical solutions, the present disclosure has the following advantages over the prior art:

The polymerization reactor of the present disclosure is designed to be able to quickly disassemble single discs in the high viscosity zone and is provided with the combinations of progressive scrapers, which can gradually reduce the thickness of the high-viscosity melt on the discs, greatly reduce the load on the agitating motor, and improve the efficiency of polymerization reaction, and especially, its detachable design greatly facilitates the manufacturing of the reactor, device maintenance, and the cleaning of the inner wall of the reactor.

The cooperation of the single discs of a detachable design and the combinations of progressive split scrapers arranged in the high viscosity zone of the polymerization reactor, greatly lowers the difficulty of installing the internals of the polymerization reactor, and it is easy to form a gel carbonization layer in the middle and upper parts of the polymerization reactor during the operation of the polymerization reactor, and when using a disk reactor of ordinary design for high-pressure cleaning of the reactor, it is difficult to clean because of the narrow space, while in the single discs of a detachable design of the present disclosure, the detachable parts can be removed, which greatly facilitates the work and operation.

By using the polymerization reactor of the present disclosure, PTEG or PCTG can be polymerized at lower temperatures (260~270° C.), and at these lower temperatures, the PETG or PCTG melt has higher dynamic viscosity, and both two high-viscosity melts can uniformly adhere to the disk reactors, at the same time, by designing the combinations of progressive scrapers, the film-forming melt on the disc surfaces of the disk reactors can be cut to control the film-forming thickness and improve polymerization efficiency.

Figure 1:
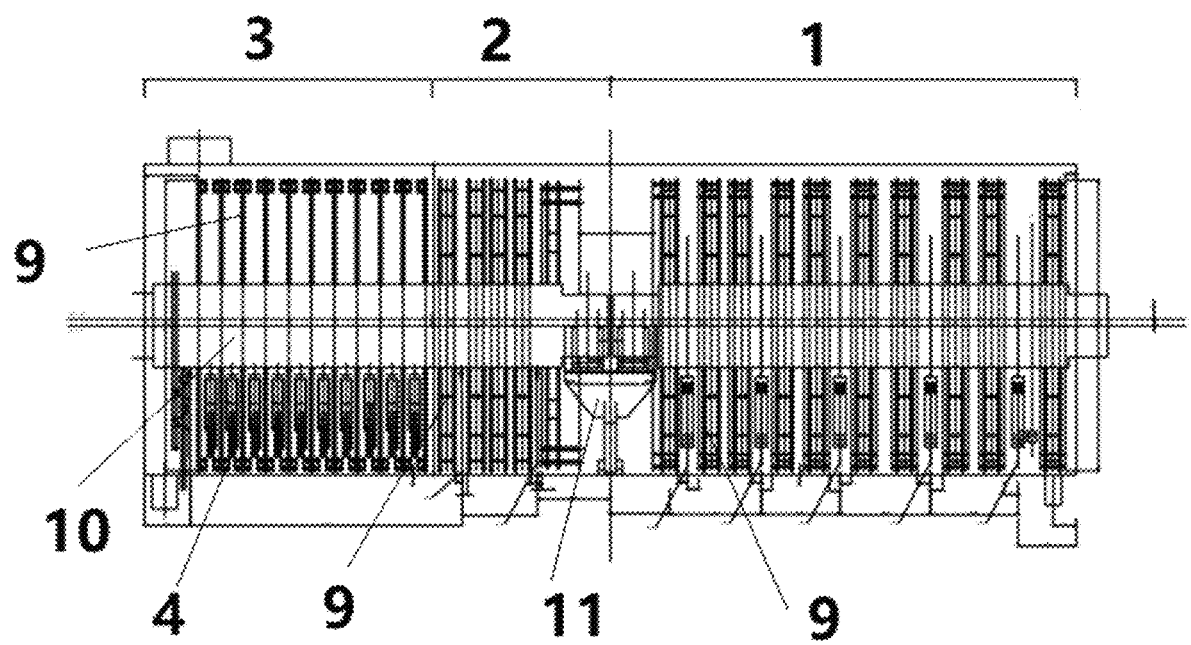
FIG. 1 is a schematic structure diagram of a polymerization reactor used in an embodiment.

wherein, 1-low viscosity zone, 2-med-high viscosity zone, 3-high viscosity zone, 4-scraper, 5-circular ring, 6-first portion, 7-second portion, 8-spoke, 9-disc reactor, 10-agitating shaft, 11-supporting seat, 12-positioning screw hole.

DETAILED DESCRIPTION OF EXEMPLARY EMBODIMENTS

The present disclosure is further explained in detail below in combination with specific embodiments; it should be understood that, those embodiments are to explain the basic principle, major features and advantages of the present disclosure, and the present disclosure is not limited by the scope of the following embodiments; the implementation conditions employed by the embodiments may be further adjusted according to particular requirements, and undefined implementation conditions usually are conditions in conventional experiments. In the following embodiments, unless otherwise specified, all raw materials are basically commercially available or prepared by conventional methods in the field.

The embodiments described below are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

The present disclosure will be further described in conjunction with the accompanying drawings and preferred embodiments of the present disclosure. In the following embodiments, it should be noted that terms such as orientations "front" and "rear" are based on the flow direction of the materials, with the directions in which the material flows first being the front and the direction in which it flows later being the rear. For example, in FIG. 1, the term "front" refers to the right side of FIG. 1, and the term "rear" refers to the left side of FIG. 1. Therefore, the orientation and positional relationship described in the present disclosure are only for the convenience of describing the disclosure and simplifying the description, and do not indicate or imply that the device or element referred to must have a specific orientation, only have a specific orientation, be constructed and operated in a specific orientation, and therefore cannot be understood as a limitation of the present disclosure.

As shown in FIGS. 1-7, a polymerization reactor for preparing a PETG or PCTG melt of the present disclosure is a horizontal polymerization reactor, and comprises a main body containing a chamber internally, the main body comprises a low viscosity zone 1, a med-high viscosity zone 2 and a high viscosity zone 3 arranged in sequence along the axial direction of the polymerization reactor, the viscosity of the PETG or PCTG melt in the low viscosity zone 1, the med-high viscosity zone 2 and the high viscosity zone 3 increases in sequence; the polymerization reactor further comprises two agitating shafts 10, one agitating shaft 10 is arranged in the low viscosity zone 1, and the other agitating shaft 10 is arranged in the med-high viscosity zone 2 and the high viscosity zone 3; the two agitating shafts 10 are respectively provided with a plurality of disc reactors 9, the disc reactors 9 in the low viscosity zone 1 are six to eight disc combinations, with three~ten discs in each combination; the disc reactors 9 in the med-high viscosity zone 2 are five to eight disc combinations in form of two-disc or three-disc combination; the disc reactors 9 in the high viscosity zone 3 are single discs, and the single discs are arranged in the polymerization reactor in a detachable manner; a combination of scrapers is further arranged on a wall of the polymerization reactor between each two adjacent single discs in the high viscosity zone 3, the combination of scrapers comprises a plurality of scrapers 4, and the distance between each scraper 4 and an adjacent single disc is different.

The distance between each scraper 4 and an adjacent single disc refers to the distance from the contact position between the scraper 4 and the wall of the polymerization reactor to the adjacent disc reactor 9.

As shown in FIGS. 2-5, the disc reactors 9 in the high viscosity zone 3 comprise circular rings 5 and a plurality of spokes 8 arranged inside the circular rings 5, the circular rings 5 comprise first portions 6 and second portions 7, the first portions 6 are fixedly connected to the plurality of spokes 8, respectively, and the second portions 7 are detachably connected to the first portions 6. The detachable connection may be a threaded connection.

The form of threaded connection may be that screw holes are provided at the ends of both the first portions 6 and the second portions 7, the two can be matched, then, impact bolts are docked with them to make the entire circular rings 5 form smooth integral discs, which can keep the device running without forming dead space.

Figure 2:
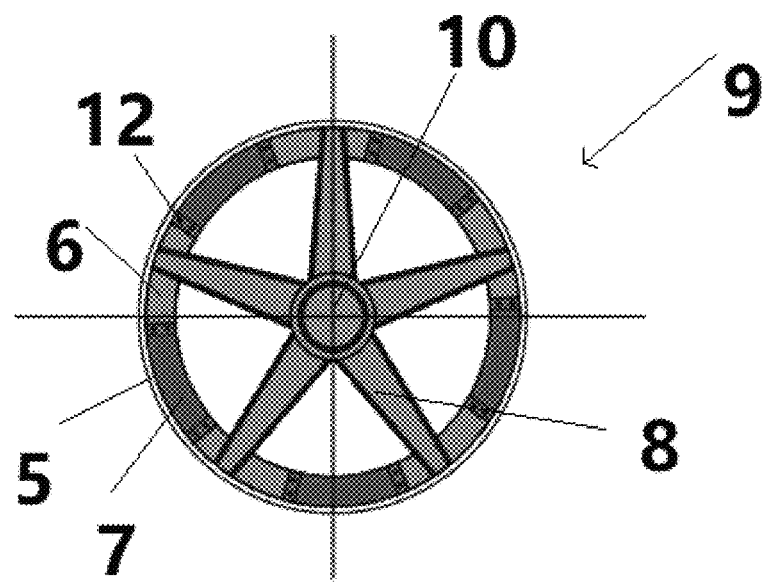
FIG. 2 is a schematic diagram of a disc reactor in the high viscosity zone of the polymerization reactor.
Figure 3:
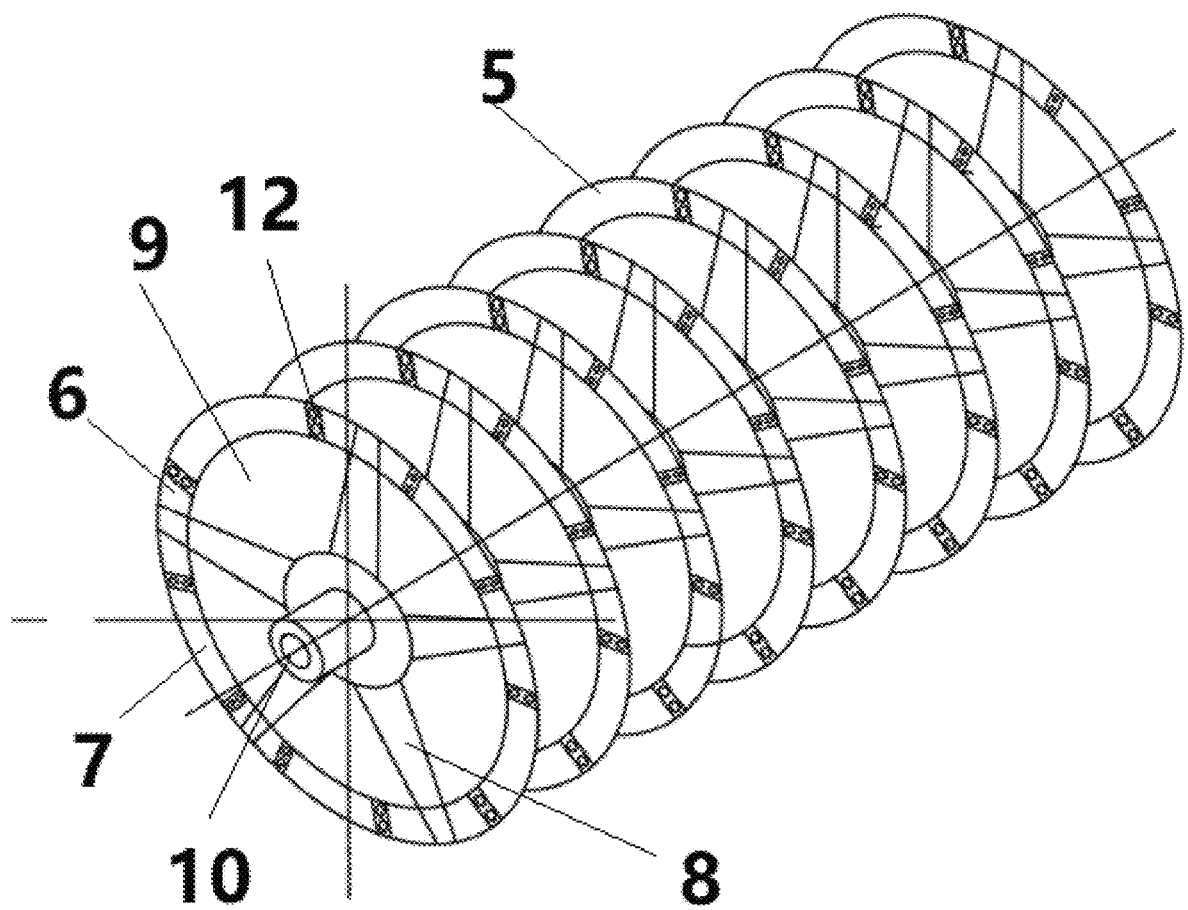
FIG. 3 is a schematic diagram of a plurality of disc reactors in the high viscosity zone of the polymerization reactor.
Figure 4:
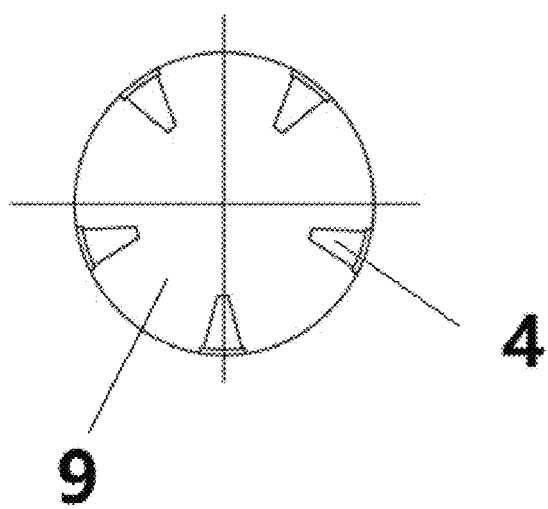
FIG. 4 is a schematic diagram of the projection of scrapers in the high viscosity zone of the polymerization reactor on a disc reactor.
Figure 5:
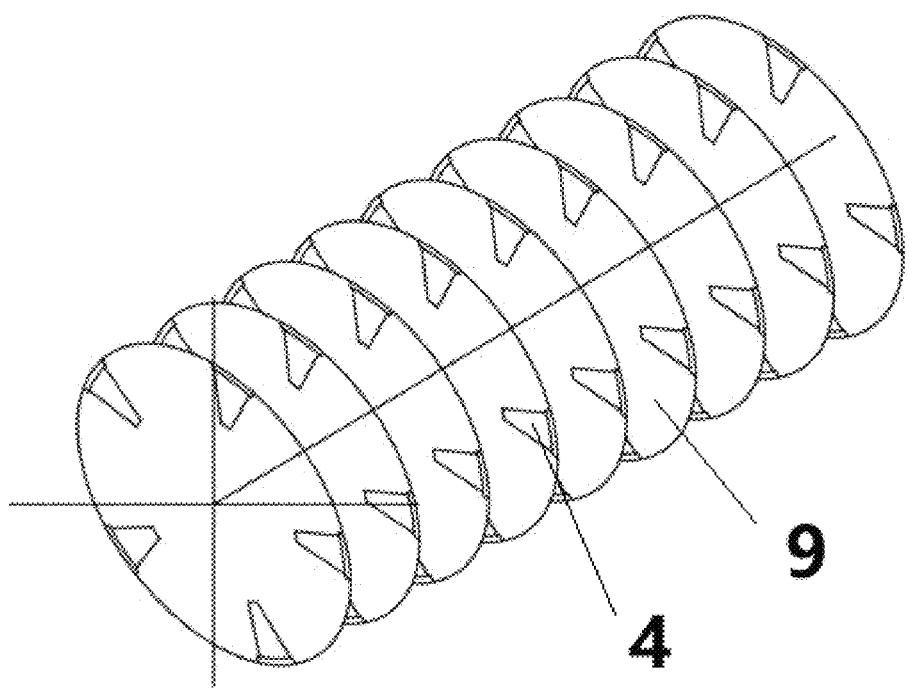
FIG. 5 is a schematic structure diagram of the scraper structure in the high viscosity zone of the polymerization reactor.

As shown in FIGS. 2-3, positioning screw holes 12 extending left and right are designed on the top ends of the spokes 8 of the disc reactors 9 in the high viscosity zone, the circular rings 5 corresponding to adjacent spokes 8 are designed with detachable segmented circular rings 5 and matched with the positioning screw holes 12 at the ends of the spokes 8, to dock with the impact bolts and form smooth integral circular rings 5.

Figure 6:
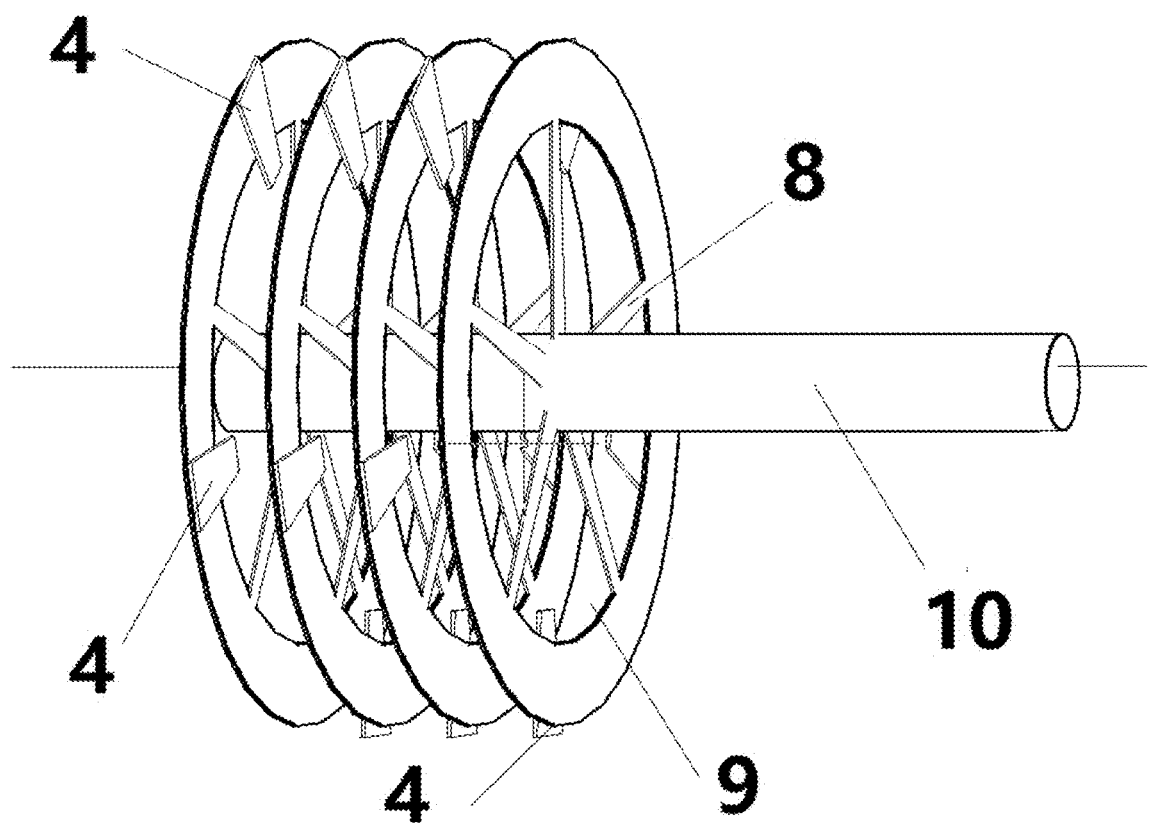
FIG. 6 is a three-dimensional schematic diagram of the scraper structure in the high viscosity zone of the polymerization reactor.
Figure 7:
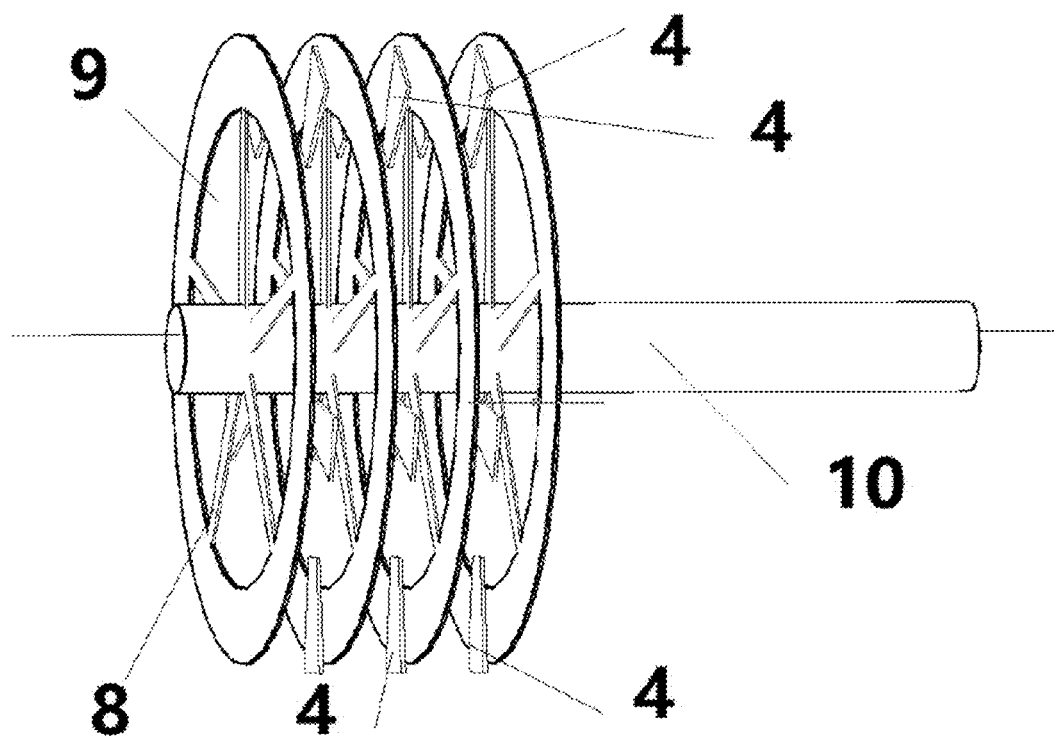
FIG. 7 is another three-dimensional schematic diagram of the scraper structure in the high viscosity zone of the polymerization reactor.

As shown in FIGS. 6-7, the plurality of scrapers 4 is arranged vertically, with the end directions of the scrapers 4 pointing towards the axes of the agitating shafts 10, and the projections of the plurality of scrapers 4 on the plane where the disc reactors 9 are located are on the same circle.

The length of each scraper 4 is the same. In the high viscosity zone 3, the distance between a scraper 4 and the adjacent previous single disc is distributed in an arithmetic sequence in every two adjacent single discs. Based on that the projections of the plurality of scrapers 4 on the plane where the disc reactors 9 are located are on the same circle, the scrapers 4 are actually mounted in a spiral state between two adjacent single discs.

In each combination of scrapers 4, the distance between the first scraper 4 and the adjacent previous single disc is 30~100 mm, and the distance between the last scraper 4 and the adjacent next single disc is 30~100 mm, preferably 40~80 mm, and more preferably 50~70 mm. In each combination of scrapers 4, the axial distance between every two adjacent scrapers 4 is 15~25 mm, preferably 20~25 mm. The cross-section of the scrapers 4 is in a wedge shape, and the thick end of the wedge is oriented towards the direction of rotation of the disc reactors 9.

The plurality of spokes 8 is five spokes 8. Five scrapers 4 are provided between every two adjacent single discs. The number of scrapers 4 is provided to be the same as the number of spokes 8, making it easy to disassemble or clean quickly.

As shown in FIG. 1, the total number of disc reactors 9 in the low viscosity zone 1 is 30~45, the total number of disc reactors 9 in the med-high viscosity zone 2 and the high viscosity zone 3 is 13~20, the total number of disc reactors 9 in the high viscosity zone 3 is 8~12, and eight~twelve combinations of scrapers 4 are provided in the high viscosity zone. The length of the low viscosity zone 1 is half of the length of the polymerization reactor, and the total length of the med-high viscosity zone 2 and the high viscosity zone 3 is half of the length of the polymerization reactor; and the ratio of the length of the med-high viscosity zone 2 to that of the high viscosity zone 3 is 1:2.

The polymerization reactor further comprises a supporting seat 11 fixedly arranged on an inner wall of the main body for supporting the two agitating shafts 10.

The polymerization reactor further comprises a prepolymer inlet located at the bottom of the front end of the low viscosity zone 1 and a high-viscosity melt outlet located at the bottom of the rear end of the high viscosity zone 3, wherein the high-viscosity melt outlet is trumpet-shaped.

The diameter of the single discs in the high viscosity zone 3 decreases from front to rear, and the diameter of the last single disc in the high viscosity zone 3 is 90%~92% of the diameter of the first single disc in the high viscosity zone 3. The distance between the disc reactors 9 and the top of the polymerization reactor is 200~300 mm. The distance between the disc reactors 9 and the bottom of the polymerization reactor is 20~50 mm.

The polymerization plant of the present disclosure may further comprise a CHDM melting and conveying system, a pulping system, a catalyst synthesis and preparation system, a composite stabilizer preparation system, an EG recovery system, a toner preparation system, and an additive injection system after melt pump (for example, for adding antioxidants, smoothing agents, ultraviolet resistant masterbatch, etc.).

Embodiment 1

This embodiment provided a method for polymerizing PETG or PCTG, which used a high-viscosity polymerization reactor with the aforementioned structure, and comprised specific steps of:

PETG polymerization:

Continuous polymerization was carried out on a 30,000 ton/year PETG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1,4-cyclohexanedimethanol CHDM in a molten state were mixed in a molar ratio of PTA: EG: CHDM=1:0.93:0.32 (where EG was in an excess feed ratio, all CHDM entered the corresponding segments in the copolyester, and the mole percentage of segments corresponding to CHDM in the total diol segments was 32%), and in a total molar ratio of PTA: (EG+CHDM)=1:1.25, the raw materials were accurately metered and slurried, tetrabutyl titanate was injected into a slurry convey pipeline as an esterification catalyst, with an amount of 3 ppm (in terms of titanium element) of the total mass of the melt, the prepared slurry was conveyed to the first esterification reactor through a screw metering pump, with the temperature in the first esterification reactor being controlled at 254~255° C. and the process column pressure being 70~80 kPa (positive pressure), the second esterification reactor was designed with multi-chambers having three chambers for easy addition of various additives, a germanium dioxide aqueous solution was added to the second chamber of the second esterification reactor (which was prepared through the following method: adding germanium dioxide powder to distilled water, and conducting a reflux reaction for 8~10 h, so that germanium dioxide reacts with water to form germanic acid. The mass concentration of germanium dioxide was about 0.8%), for the polymerization catalyst (added in the second chamber to facilitate evaporation of water in the catalyst), the amount of polymerization catalyst was 120 ppm (in terms of germanium dioxide) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as follows: 255~256° C. in the first chamber, 253~254° C. in the second chamber, and 257~258° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 258~260° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 260~262° C., the prepolymers from the reaction in the second prepolymerization reactor were introduced into the high viscosity polymerization reactor through the prepolymerization melt pump and the prepolymerization filter, the high viscosity polymerization reactor adopted the specific structure mentioned above, the temperature at the outlet of the high viscosity polymerization reactor was controlled to be 265~268° C., the vacuum degree was controlled to be 80~110 Pa, the dynamic viscosity of the melt at the outlet was controlled to 635~650 Pa. s, the intrinsic viscosity of PETG at the outlet was controlled to 0.781 (determined in a mixed solvent of phenol: tetrachloroethane with a volume ratio of 3:2). The indicators for PETG chip are shown in Table 1. In the present disclosure, all properties of the melt chip were tested using GB/T 14190-2017 standard, where the intrinsic viscosity was determined in a mixed solvent of phenol and tetrachloroethane with a volume ratio of 3:2, and moisture, ash content, ferrum content, and agglomerated particles refer to the mass fraction content of water, ash, Fe element, and agglomerated particles in the polyester, respectively.

Or PCTG polymerization:

Continuous polymerization was carried out on a 30,000 ton/year PCTG continuous polymerization plant, which comprised a first esterification reactor, a second esterification reactor (a three-chamber structure), a first prepolymerization reactor, a second prepolymerization reactor, and a high viscosity polymerization reactor.

Firstly, pure terephthalic acid PTA, ethylene glycol EG, and 1,4-cyclohexanedimethanol CHDM in a molten state were mixed in a molar ratio of PTA: EG: CHDM=1:0.63: 0.63 (where EG was in an excess feed ratio, in the copolyester, the mole percentage of segments corresponding to CHDM in the total diol segments was 62%), and in a total molar ratio of PTA: (EG+CHDM)=1:1.26, the raw materials were accurately metered and slurried, tetrabutyl titanate was injected into a slurry convey pipeline as an esterification catalyst, with an amount of 3 ppm (in terms of titanium element) of the total mass of the melt, the prepared slurry was conveyed to the first esterification reactor through a screw metering pump, with the temperature in the first esterification reactor being controlled at 256~257° C. and the process column pressure being 70~80 kPa (positive pressure), the second esterification reactor was designed with multi-chambers having three chambers for easy addition of various additives, a germanium dioxide aqueous solution was added to the second chamber of the second esterification reactor (which was prepared through the same method mentioned above. The mass concentration of germanium dioxide was about 0.8%), for the polymerization catalyst (added in the second chamber to facilitate evaporation of water in the catalyst), the amount of polymerization catalyst was 120 ppm (in terms of germanium dioxide) of the total mass of the melt, a toner and a stabilizer (phosphate ester, etc.) were added into the third chamber of the second esterification reactor, the second esterification reactor was a normal-pressure reactor, and the esterification temperatures in the three chambers were controlled as: 255~256° C. in the first chamber, 253~254° C. in the second chamber, and 260~262° C. in the third chamber; the esterified materials after the esterification reactions were introduced into the first prepolymerization reactor, which was a vertical agitating structure with an inner and outer chamber design, the reaction temperature in the first prepolymerization reactor was controlled to be 266~268° C. and the vacuum degree was 9.0 kPa, the oligomer polymerized in the first prepolymerization reactor was introduced into the second prepolymerization reactor, which was a single-axis horizontal disc reactor, the reaction temperature in the second prepolymerization reactor was controlled to be 272~274° C., the prepolymer from the reaction in the second prepolymerization reactor were introduced into the high viscosity polymerization reactor through the prepolymerization melt pump and the prepolymerization filter, the high viscosity polymerization reactor adopted a two-shaft horizontal disc reactor with the shafts respectively arranged in front and rear portions, the temperature at the outlet of the high viscosity polymerization reactor was controlled to be 280~282° C., the vacuum degree was controlled to be 90~110 Pa, the dynamic viscosity of the melt at the outlet was controlled to 600~620 Pa. s, the intrinsic viscosity of PCTG at the outlet was controlled to 0.801 (determined in a mixed solvent of phenol: tetrachloroethane with a volume ratio of 3:2). The indicators for PCTG chip are shown in Table 2.

Embodiment 2

This embodiment provided a method for polymerizing PETG or PCTG, which used a high-viscosity polymerization reactor with the aforementioned structure, and the specific steps of the polymerization method were basically the same as Embodiment 1, by only differing in that: the polymerization catalyst was prepared by first vacuum distilling a germanium dioxide aqueous solution to remove half of the total mass of water, adding the same mass of fresh ethylene glycol EG under agitating conditions to prepare a solution of germanium dioxide dispersed in a mixed solvent of water and ethylene glycol, the mass concentration of germanium dioxide was also 0.8%, and the mass ratio of water to ethylene glycol was 1:1. The polymerization results are shown in Tables 1-2.

Embodiment 3

This embodiment provided a method for polymerizing PETG or PCTG, which used a high-viscosity polymerization reactor with the aforementioned structure, and the specific steps of the polymerization method were basically the same as Embodiment 1, by only differing in that: the polymerization catalyst, namely the germanium dioxide aqueous solution was replaced by a surface deposited supported germanium-based catalyst (the carrier was nanoporous barium sulfate).

The Method for Preparing the Catalyst was as Follows:
1) Ethylene glycol was heated to 50° C., accurately measured barium hydroxide octahydrate was slowly add into the reactor under high-speed agitating conditions (a high-speed homogenizer: speed 3000~6000 rpm), agitated until completely dissolved, then 10% mass concentration of dilute sulfuric acid was quickly added to the reactor according to the equimolar ratio of barium ions, high-speed agitation was maintained for 1.0 hour, the reaction heat heated up the suspension to about 90° C., the pH of the suspension was adjusted to be stable at 7.0, then the system was heated and refluxed to evaporate water, and cooled to 170° C., ethylene glycol was added again to make the mass content of barium sulfate powder be 20%, the system was agitated for 0.5 hour, and the pH value was measured again until the suspension pH value was completely stable at 7.0, and the obtained barium sulfate powder had a particle size of 20 nm and a specific surface area of 350 m²/g.
2) Tetraethyl silicate and sodium hydroxide were added dropwise to a suspension of barium sulfate in ethylene glycol with a pH of 7.0 to coat the surface of the barium sulfate powder with a layer of silica; after aging for 6 hours, a prepared mixed aqueous solution of calcium chloride, aluminum chloride, and zirconium acetate (where, the molar concentration of calcium chloride was 2.5 mol/L, the molar concentration of aluminum chloride was 0.5 mol/L, and the molar concentration of zirconium acetate was 0.8 mol/L), as well as a mixed aqueous solution of sodium hydroxide and sodium bicarbonate with a total molar concentration of 0.5 mol/L, were added dropwise to the reactor under high-speed agitating conditions in an amount in which the total valence of the above three metal ions was equal to the total valence of hydroxide and carbonate ions, the pH value of the suspension was strictly controlled between 10.0 and 10.2 during the addition process. The dropwise addition time was controlled to 11 hours, and the reaction temperature was controlled to 80° C., to allow the three metals mentioned above to deposit on the surface of the carrier. The obtained suspension continued to be agitated and aged for 1.0 hour, then the system continued to be agitated under pressurized conditions (pressure of 0.7 Mpa) and at the same time the system was heated to 180° C., after 2.0 hours of equilibration, the pressure was rapidly depressurized to atmospheric pressure, the suspension was cooled to room temperature, filtered, washed, dried, crushed with an ultra-fine pulverizer, and calcined in a muffle furnace at a calcination temperature of 290° C. for 6 hours, and the metal basic carbonates deposited on the surface of the carrier were dehydrated and pore-formed, forming a supported deposition layer with a porous structure on the surface of the carrier. The specific surface area of the carrier containing the supported deposition layer was 600~900 $m^2/g$.

3) Distilled water was added to the carrier containing the supported deposition layer obtained in step 2) under agitating conditions to prepare a suspension with a mass percentage of 20%, after grinding the suspension twice using an ultrafine grinder, the suspension was heated to 90° C. A certain amount of germanium tetrachloride was slowly added dropwise to the above suspension under agitating conditions within 4.0 hours, germanium tetrachloride underwent a hydrolysis reaction with water to generate germanium dioxide, which was deposited on the surface of the supported deposition layer. During the dropwise addition process, sodium hydroxide was used to adjust the pH of the suspension, maintaining pH between 10.0 and 10.2. After the dropwise addition was completed, the system was agitated and aged at 90° C. for 1.5 hours, then a certain amount of silicate ester was slowly added to the suspension within 2.0 hours, and after the dropwise addition was completed, the system was aged for 1.0 hour to obtain the catalyst suspension. The mass ratio of silicate ester to germanium tetrachloride was 1:0.2.

4) The above catalyst suspension was filtered, washed with distilled water, dried and crushed to give a supported germanium-based catalyst powder, which can be directly used for packaging and storage. When used for polymerization reaction, the powder was dispersed in ethylene glycol to obtain a suspension, and the mass percentage of catalyst powder in the suspension was 20%. The catalyst powder had a specific surface area of 280 $m^2/g$, and a particle size of 100 nm. In the catalyst powder, the mass ratio of the carrier, the supported deposition layer and the effective germanium in the active component was 72.5:7.5:5.0.

The polymerization results are shown in Tables 1-2.

Embodiment 4

This embodiment provided a method for polymerizing PETG or PCTG, which used a high-viscosity polymerization reactor with the aforementioned structure, and the specific steps of the polymerization method were basically the same as Embodiment 3, by only differing in that: the carrier of the polymerization catalyst was different, specifically, when preparing the polymerization catalyst, step 1) was not performed, and the suspension of barium sulfate in ethylene glycol with a pH of 7.0 in step 2) was replaced with a suspension of gamma (γ)-nanoporous alumina in water with a pH of 7.0, wherein the γ-nanoporous alumina had a particle size of 35 nm and a specific surface area of 240 $m^2/g$.

The polymerization results are shown in Tables 1-2.

Embodiment 5

This embodiment provided a method for polymerizing PETG or PCTG, which used a high-viscosity polymerization reactor with the aforementioned structure, and the specific steps of the polymerization method were basically the same as Embodiment 3, by only differing in that: the carrier of the polymerization catalyst was different, specifically, when preparing the polymerization catalyst, step 1) was not performed, and the suspension of barium sulfate in ethylene glycol with a pH of 7.0 in step 2) was replaced with a suspension of nanoporous alumina-zirconium oxide powder in water with a pH of 7.0, wherein the nanoporous alumina-zirconium oxide powder had a particle size of 60 nm and a specific surface area of 300 $m^2/g$. The polymerization results are shown in Tables 1-2.

Embodiment 6

This embodiment provided a method for polymerizing PETG or PCTG, which used a high-viscosity polymerization reactor with the aforementioned structure, and the specific steps of the polymerization method were basically the same as Embodiment 3, by only differing in that: the polymerization catalyst, namely the surface deposited supported germanium-based catalyst (the carrier was nanoporous barium sulfate) was replaced with a surface deposited supported titanium-germanium-based composite catalyst (the carrier was nanoporous barium sulfate).

The method for preparing the catalyst was basically the same as Embodiment 3, by only differing in that: when preparing the catalyst, both titanium and germanium sources were added at the same time in step 3), and step 3) was specifically: distilled water was added to the carrier containing the supported deposition layer obtained in step 2) under agitating conditions to prepare a suspension with a mass percentage of 20%, after grinding the suspension twice using an ultrafine grinder, the suspension was heated to 90° C. A certain amount of a solution of germanium tetrachloride in dilute hydrochloric acid and a certain amount of tetrabutyl titanate were slowly added dropwise to the above suspension under agitating conditions within 4.0 hours, germanium tetrachloride underwent a hydrolysis reaction with water to generate germanium dioxide, and tetrabutyl titanate underwent a hydrolysis reaction with water to generate titanium dioxide, and both of titanium dioxide and germanium dioxide were deposited on the surface of the supported deposition layer. During the dropwise addition process, sodium hydroxide was used to adjust the pH of the suspension, maintaining pH between 10.0 and 10.2. After the dropwise addition was completed, the system was agitated and aged at 90° C. for 1.5 hours, then a certain amount of silicate ester was slowly added to the suspension within 2.0 hours, and after the dropwise addition was completed, the system was aged for 1.0 hour to obtain the catalyst suspension. The ratio of the mass of the silicate ester to the total mass of germanium tetrachloride and tetrabutyl titanate was 1:0.2. The molar ratio of tetrabutyl titanate to germanium tetrachloride was 1:1.5.

The catalyst powder obtained in step 4) had a specific surface area of 280 $m^2/g$, and a particle size of 100 nm. In the catalyst powder, the mass ratio of the carrier, the supported deposition layer, the effective germanium in the active component and the effective titanium in the active component was 78.1:7.5:2.5:1.25. The catalyst suspension in EG obtained in step 4) was a stable suspension that can be stored for 5 months without settling.

The polymerization results are shown in Tables 1-2.

Embodiment 7

This embodiment provided a method for polymerizing PETG or PCTG, which used a high-viscosity polymerization reactor with the aforementioned structure, and the specific steps of the polymerization method were basically the same as Embodiment 6, by only differing in that: the polymerization catalyst, namely the surface deposited supported titanium-germanium-based composite catalyst (the carrier was nanoporous barium sulfate) was replaced with another surface deposited supported titanium-germanium-based composite catalyst (the carrier was γ-nanoporous alumina powder). When preparing the catalyst, step 1) was not performed, and the suspension of barium sulfate in ethylene glycol with a pH of 7.0 in step 2) was replaced with a suspension of γ-nanoporous alumina in water with a pH of 7.0, wherein the γ-nanoporous alumina had a particle size of 35 nm and a specific surface area of 240 $m^2/g$.

The polymerization results are shown in Tables 1-2.

Embodiment 8

This embodiment provided a method for polymerizing PETG or PCTG, which used a high-viscosity polymerization reactor with the aforementioned structure, and the specific steps of the polymerization method were basically the same as Embodiment 6, by only differing in that: the polymerization catalyst, namely the surface deposited supported titanium-germanium-based composite catalyst (the carrier was nanoporous barium sulfate) was replaced with another surface deposited supported titanium-germanium-based composite catalyst (the carrier was nanoporous alumina-zirconium oxide powder). When preparing the catalyst, step 1) was not performed, and the suspension of barium sulfate in ethylene glycol with a pH of 7.0 in step 2) was replaced with a suspension of nanoporous alumina-zirconium oxide powder in water with a pH of 7.0, wherein the nanoporous alumina-zirconium oxide powder had a particle size of 60 nm and a specific surface area of 300 $m^2/g$.

The polymerization results are shown in Tables 1-2.

Comparative Example 1

This comparative example provided a method for polymerizing PETG or PCTG, the high-viscosity polymerization reactor used in this polymerization method was an ordinary two-shaft horizontal polymerization reactor with the shafts respectively arranged in front and rear portions, the front-rear two-shaft arrangement and the disc reactor arrangement in the polymerization reactor were the same as those of the polymerization reactor of the present disclosure, and there were also scrapers arranged between each two adjacent disc reactors in the high viscosity zone, but the scrapers were integrated with the wall of the polymerization reactor, and were not provided with a plurality of split scrapers. The specific steps of the polymerization method for Comparative Example 1 were the same as those in Embodiment 1. The polymerization results are shown in Tables 1-2.

The polyester melts obtained from the respective embodiments and comparative examples was sliced, and properties of chips were tested using GB/T 14190-2017 standard, and the results are shown in Tables 1-2, where IV refers to intrinsic viscosity measured in a mixed solvent of phenol and tetrachloroethane with a volume ratio of 3:2, and DEG, $H_2O$, ash content, Fe, and agglomerated particles refer to the mass fraction content of diethylene glycol, water, ash, Fe element, and agglomerated particles in the polyester, respectively.

TABLE 1

| | Physical and chemical indicators of PETG | | | | | | | | |
|---|---|---|---|---|---|---|---|---|---|
| | | | End carboxyl | $H_2O$/ | Ash/ | Fe/ mg/ | Agglomerated particles of | Hue | | |
| | IV/dL/g | DEG/% | content/mol/t | % | % | kg | ≤10 μm/% | L | a | b |
| Embodiment 1 | 0.782 | 1.217 | 15.22 | 0.55 | 0.01 | 1 | 0.0 | 65.55 | 1.24 | 1.77 |
| Embodiment 2 | 0.784 | 1.206 | 15.38 | 0.60 | 0.01 | 1 | 0.0 | 65.29 | −1.61 | −1.52 |
| Embodiment 3 | 0.781 | 1.235 | 15.39 | 0.59 | 0.01 | 1 | 0.0 | 65.38 | −1.57 | −1.08 |
| Embodiment 4 | 0.783 | 1.227 | 15.57 | 0.67 | 0.01 | 1 | 0.0 | 65.42 | −1.78 | 1.23 |
| Embodiment 5 | 0.778 | 1.238 | 15.45 | 0.62 | 0.00 | 1 | 0.0 | 64.89 | −1.82 | −2.01 |
| Embodiment 6 | 0.783 | 1.231 | 15.21 | 0.58 | 0.01 | 1 | 0.0 | 64.12 | 1.27 | −0.92 |
| Embodiment 7 | 0.780 | 1.225 | 15.38 | 0.62 | 0.01 | 1 | 0.0 | 64.48 | 1.42 | −1.03 |
| Embodiment 8 | 0.779 | 1.227 | 15.31 | 0.60 | 0.01 | 1 | 0.0 | 64.39 | −1.50 | −1.52 |
| Comparative example 1 | 0.692 | 1.351 | 20.55 | 0.54 | 0.00 | 1 | 0.3 | 60.37 | −0.41 | 5.92 | posite catalyst (the carrier was nanoporous alumina-zirco-

TABLE 2

Physical and chemical indicators of PCTG

| | IV/dL/g | DEG/% | End carboxyl content/mol/t | H$_2$O/% | Ash/% | Fe/mg/kg | Agglomerated particles of ≤10 μm/% | Hue L | a | b |
|---|---|---|---|---|---|---|---|---|---|---|
| Embodiment 1 | 0.797 | 0.382 | 15.24 | 0.59 | 0.01 | 1 | 0.0 | 65.21 | −1.57 | −1.61 |
| Embodiment 2 | 0.802 | 0.377 | 15.33 | 0.65 | 0.01 | 1 | 0.0 | 65.33 | −1.49 | −1.72 |
| Embodiment 3 | 0.803 | 0.387 | 15.45 | 0.70 | 0.01 | 1 | 0.0 | 64.68 | −1.07 | −0.99 |
| Embodiment 4 | 0.797 | 0.379 | 14.89 | 0.63 | 0.01 | 1 | 0.0 | 64.98 | −1.59 | −1.25 |
| Embodiment 5 | 0.802 | 0.385 | 14.96 | 0.59 | 0.01 | 1 | 0.0 | 65.29 | −1.80 | −0.75 |
| Embodiment 6 | 0.800 | 0.382 | 15.46 | 0.58 | 0.01 | 1 | 0.0 | 63.65 | −1.34 | −0.83 |
| Embodiment 7 | 0.803 | 0.377 | 15.89 | 0.60 | 0.01 | 1 | 0.0 | 64.02 | −1.52 | −1.05 |
| Embodiment 8 | 0.799 | 0.380 | 14.93 | 0.62 | 0.01 | 1 | 0.0 | 63.25 | −1.61 | −0.84 |
| Comparative example 1 | 0.705 | 0.484 | 21.67 | 0.52 | 0.01 | 1 | 0.2 | 59.89 | −0.33 | 4.69 |

It can be seen that by using the specific high viscosity polymerization reactor of the present disclosure, a PETG or PCTG melt with high viscosity can be prepared. And while ensuring excellent performance in other aspects, it can significantly improve the hue performance of polymer products. At the same time, the polymerization reactor can extend the operating cycle of the polymerization device and is easy to clean.

The embodiments described above are only for illustrating the technical concepts and features of the present disclosure, and are intended to make a person familiar with the technology being able to understand the content of the present disclosure and thereby implement it, and should not limit the protective scope of this disclosure. Any equivalent variations or modifications according to the spirit of the present disclosure should be covered by the protective scope of the present disclosure.

What is claimed is:

1. A polymerization reactor for preparing a PETG or PCTG melt, the PETG or PCTG melt having an intrinsic viscosity above 0.770, wherein, the polymerization reactor is a horizontal polymerization reactor, and comprises a main body containing a chamber internally, the main body comprises a low viscosity zone, a med-high viscosity zone and a high viscosity zone arranged in sequence along the axial direction of the polymerization reactor, the viscosity of the PETG or PCTG melt in the low viscosity zone, the med-high viscosity zone and the high viscosity zone increases in sequence; the polymerization reactor further comprises two agitating shafts, one agitating shaft is arranged in the low viscosity zone, and the other agitating shaft is arranged in the med-high viscosity zone and the high viscosity zone; the two agitating shafts are respectively provided with a plurality of disc reactors, the disc reactors in the low viscosity zone are six~eight disc combinations, with three~ten discs in each combination; the disc reactors in the med-high viscosity zone are five~eight disc combinations in form of two-disc or three-disc combination; the disc reactors in the high viscosity zone are single discs, and the single discs are arranged in the polymerization reactor in a detachable manner; a combination of scrapers is further arranged on a wall of the polymerization reactor between each two adjacent single discs in the high viscosity zone, the combination of scrapers comprises a plurality of scrapers, and the distance between each scraper and adjacent single discs is different;

the disc reactors in the high viscosity zone comprise circular rings and a plurality of spokes arranged inside the circular rings, the circular rings comprise first portions and second portions, the first portions are fixedly connected to the plurality of spokes, respectively, and the second portions are detachably connected to the first portions; and the plurality of scrapers is arranged vertically, with the end directions of the scrapers pointing towards the axes of the agitating shafts, and the projections of the plurality of scrapers on the plane where the disc reactors are located are on the same circle.

2. The polymerization reactor for preparing a PETG or PCTG melt according to claim 1, wherein, the detachable connection is a threaded connection.

3. The polymerization reactor for preparing a PETG or PCTG melt according to claim 1, wherein, the plurality of spokes is five spokes.

4. The polymerization reactor for preparing a PETG or PCTG melt according to claim 1, wherein, positioning screw holes extending left and right are designed on the top ends of the spokes of the disc reactors in the high viscosity zone, the circular rings corresponding to adjacent spokes are designed with detachable segmented circular rings and matched with the screw holes at the ends of the spokes, to dock with impact bolts and form smooth integral circular rings.

5. The polymerization reactor for preparing a PETG or PCTG melt according to claim 1, wherein, in each combination of scrapers, the axial distance between every two adjacent scrapers is 15~25 mm.

6. The polymerization reactor for preparing a PETG or PCTG melt according to claim 5, wherein, the length of each scraper is the same; and/or, in the high viscosity zone, the distance between a scraper and the adjacent previous single disc is distributed in an arithmetic sequence in every two adjacent single discs.

7. The polymerization reactor for preparing a PETG or PCTG melt according to claim 1, wherein, the cross-section of the scrapers is in a wedge shape; the thick end of the wedge is oriented towards the direction of rotation of the disc reactors; and/or, there are five scrapers arranged between every two adjacent single discs.

8. The polymerization reactor for preparing a PETG or PCTG melt according to claim 1, wherein, the total number of disc reactors in the low viscosity zone is 30~45, the total number of disc reactors in the med-high viscosity zone and the high viscosity zone is 13~20, the total number of disc reactors in the high viscosity zone is 8~12, and 8~12 combinations of scrapers are provided in the high viscosity zone.

9. The polymerization reactor for preparing a PETG or PCTG melt according to claim 1, wherein, the length of the low viscosity zone is half of the length of the polymerization reactor, and the total length of the med-high viscosity zone and the high viscosity zone is half of the length of the polymerization reactor; and the ratio of the length of the med-high viscosity zone to that of the high viscosity zone is 1:2.

10. The polymerization reactor for preparing a PETG or PCTG melt according to claim 1, wherein, the diameter of the single discs in the high viscosity zone decreases from front to rear, and the diameter of the last single disc in the high viscosity zone is 90%~92% of the diameter of the first single disc in the high viscosity zone; and/or, the distance between the disc reactors and the top of the polymerization reactor is 200~300 mm; and/or, the distance between the disc reactors and the bottom of the polymerization reactor is 20~50 mm.

11. A method for polymerizing PETG or PCTG, the PETG or PCTG having an intrinsic viscosity above 0.770, wherein, the polymerization method comprises a step of sequentially passing terephthalic acid, ethylene glycol, and 1, 4-cyclohexanedimethanol through a first esterification reactor and a second esterification reactor for esterification reactions, through a first prepolymerization reactor and a second prepolymerization reactor for prepolymerization reactions to give a prepolymer, and a step of adding the prepolymer to the polymerization reactor to carry out a polymerization reaction to obtain the PETG or PCTG, where the polymerization reactor is the polymerization reactor for preparing a PETG or PCTG melt according to claim 1.

12. The method for polymerizing PETG or PCTG according to claim 11, wherein, the PETG has an intrinsic viscosity of 0.770~0.820, and the PCTG has an intrinsic viscosity of 0.790~0.820.

13. The method for polymerizing PETG or PCTG according to claim 11, wherein, the preparation method further comprises a step of adding an esterification catalyst to the first esterification reactor before carrying out the esterification reaction, wherein the esterification catalyst is selected from tetrabutyl titanate, tetraisopropyl titanate, and tetra (2-ethylhexyloxy) titanate.

14. The method for polymerizing PETG or PCTG according to claim 13, wherein the mass of titanium element in the esterification catalyst accounts for 1~3 ppm of the mass of the PETG or PCTG.

15. The method for polymerizing PETG or PCTG according to claim 11, wherein, the esterification reaction in the second esterification reactor is carried out at atmospheric pressure; and/or, the second esterification reactor is a horizontal reactor, and comprises three compartments arranged in sequence from front to rear, and the preparation method further comprises a step of injecting a polymerization catalyst to the third compartment from front to rear of the second esterification reactor.

16. The method for polymerizing PETG or PCTG according to claim 15, wherein, the polymerization catalyst is selected from a germanium dioxide aqueous solution, a suspension of germanium dioxide dispersed in a mixed solvent of water and ethylene glycol, a surface deposited supported germanium-based catalyst, and a surface deposited supported titanium-germanium-based composite catalyst;

the surface deposited supported germanium-based catalyst and the surface deposited supported titanium-germanium-based composite catalyst comprise a carrier, a supported deposition layer, and an active component, respectively, where the carrier is an inorganic porous material modified and coated by silicate ester, the supported deposition layer is located on the carrier and has a porous structure, and the active component is deposited on the supported deposition layer;

the surface deposited supported germanium-based catalyst is prepared by a preparation method comprising steps of: precipitating, filtering, and calcining a suspension of a carrier, a water-soluble calcium salt, a water-soluble aluminum salt, a water-soluble zirconium salt with a water-soluble hydroxide and an alkali to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a germanium source to obtain a catalyst precursor; carrying out a coating reaction on the catalyst precursor with silicate ester and water, and depositing the active component on the supported deposition layer to obtain the surface deposited supported germanium-based catalyst;

the surface deposited supported titanium-germanium-based catalyst is prepared by a preparation method comprising steps of: precipitating, filtering, and calcining a suspension of a carrier, a water-soluble calcium salt, a water-soluble aluminum salt, a water-soluble zirconium salt with a water-soluble hydroxide and an alkali to form the supported deposition layer on the carrier; the alkali is selected from carbonates and/or bicarbonates; the specific surface area of the carrier containing the supported deposition layer is greater than the specific surface area of the carrier; dispersing the carrier containing the supported deposition layer in water to obtain a suspension of the carrier containing the supported deposition layer; carrying out a hydrolysis reaction on the suspension of the carrier containing the supported deposition layer with a solution of a germanium source in hydrochloric acid and a titanium source to obtain a catalyst precursor; carrying out a coating reaction on the catalyst precursor with silicate ester and water, and depositing the active component on the supported deposition layer to obtain the surface deposited supported titanium-germanium-based composite catalyst.

17. The method for polymerizing PETG or PCTG according to claim 16, wherein, the polymerization catalyst is selected from a germanium dioxide aqueous solution or a suspension of germanium dioxide dispersed in a mixed solvent of water and ethylene glycol, and the mass of germanium dioxide in the polymerization catalyst accounts for 100~150 ppm of the mass of PETG or PCTG; or, the polymerization catalyst is selected from surface deposited supported germanium-based catalysts, and in terms of germanium dioxide, the mass of the germanium element in the polymerization catalyst accounts for 50~75 ppm of the mass of PETG or PCTG; or, the polymerization catalyst is selected from surface deposited supported titanium-germanium-based composite catalysts, and in terms of germanium dioxide, the mass of the titanium element and the germanium element in the polymerization catalyst accounts for 8~12 ppm and 25~50 ppm of the mass of PETG or PCTG, respectively.

18. The method for polymerizing PETG or PCTG according to claim 11, wherein, the polymerization method further comprises steps of premelting 1,4-cyclohexanedimethanol and transporting the melted 1,4-cyclohexanedimethanol to the first esterification reactor.

19. The method for polymerizing PETG or PCTG according to claim 11, wherein, when preparing PETG, the feeding molar ratio of terephthalic acid, ethylene glycol, and 1,4-cyclohexanedimethanol is 1: (0.92~0.93): (0.325~0.315); or, when preparing PCTG, the feeding ratio of terephthalic acid, ethylene glycol, and 1,4-cyclohexanedimethanol is 1: (0.63~0.64): (0.610~0.615).

20. The polymerization reactor for preparing a PETG or PCTG melt according to claim 6, wherein, in each combination of scrapers, the distance between the first scraper and the adjacent previous single disc is 30~100 mm, and the distance between the last scraper and the adjacent next single disc is 30~100 mm.

\* \* \* \* \*